US010284300B2

(12) United States Patent
Doerr et al.

(10) Patent No.: US 10,284,300 B2
(45) Date of Patent: May 7, 2019

(54) MONOLITHIC SILICON COHERENT TRANSCEIVER WITH INTEGRATED LASER AND GAIN ELEMENTS

(71) Applicant: Acacia Communications, Inc., Maynard, MA (US)

(72) Inventors: Christopher Doerr, Middletown, NJ (US); Long Chen, Marlboro, NJ (US)

(73) Assignee: Acacia Communications, Inc., Maynard, MA (US)

(*) Notice: Subject to any disclaimer, the term of this patent is extended or adjusted under 35 U.S.C. 154(b) by 369 days.

(21) Appl. No.: 14/298,862

(22) Filed: Jun. 6, 2014

(65) Prior Publication Data

US 2015/0358083 A1 Dec. 10, 2015
US 2016/0308618 A9 Oct. 20, 2016

Related U.S. Application Data

(60) Provisional application No. 61/832,022, filed on Jun. 6, 2013.

(51) Int. Cl.
*H04B 10/40* (2013.01)
*G02B 6/00* (2006.01)

(52) U.S. Cl.
CPC .............. *H04B 10/40* (2013.01); *G02B 6/00* (2013.01)

(58) Field of Classification Search
CPC ............ H01L 24/30; H04B 10/40; G02B 6/00
USPC ....................................................... 257/186
See application file for complete search history.

(56) References Cited

U.S. PATENT DOCUMENTS

| 5,999,670 | A  | * | 12/1999 | Yoshimura ........... G02B 6/1221 385/123 |
| 7,400,801 | B1 | * | 7/2008  | Tong .................... G02B 6/1228 385/14 |
| 9,496,431 | B2 | * | 11/2016 | Krasulick ......... H01L 31/02327 |
| 2004/0042729 | A1 | * | 3/2004 | Zhou et al. ..................... 385/49 |
| 2010/0150494 | A1 | * | 6/2010 | Prosyk ................. G02B 6/1228 385/2 |
| 2010/0214651 | A1 | * | 8/2010 | Kim ....................... B82Y 20/00 359/344 |
| 2010/0296812 | A1 | * | 11/2010 | Asghari .......................... 398/82 |
| 2011/0043895 | A1 | * | 2/2011 | Hikmet ......................... 359/328 |
| 2011/0243494 | A1 | * | 10/2011 | Hasegawa et al. ............. 385/14 |
| 2012/0321244 | A1 | * | 12/2012 | Suzuki .................... G02B 6/305 385/14 |
| 2014/0111793 | A1 | * | 4/2014 | Asghari ................ G01J 1/0425 356/73 |
| 2014/0319656 | A1 | * | 10/2014 | Marchena et al. ............ 257/615 |

(Continued)

OTHER PUBLICATIONS

Chen et al., Low-Loss and Broadband Cantilever Couplers Between Standard Cleaved Fibers and High-Index-Contrast $Si_3N_4$ or Si Waveguides. Phot Tech Lett IEEE. Oct. 7, 2010;22(23):1744-6. doi: 10.1109/LPT.2010.2085040.

(Continued)

*Primary Examiner* — Peter Bradford
(74) *Attorney, Agent, or Firm* — Wolf, Greenfield & Sacks, P.C.

(57) ABSTRACT

Disclosed are structures and methods for a monolithic silicon (Si) coherent transceiver with integrated laser and gain elements wherein an InP chip is bonded to the Si chip in a recess formed in that Si chip.

16 Claims, 2 Drawing Sheets

(56) References Cited

U.S. PATENT DOCUMENTS

2015/0355482 A1* 12/2015 Akiyama ................ G02F 1/025
    385/2
2016/0327738 A1* 11/2016 Doerr ...................... G02F 1/011
2017/0199328 A1* 7/2017 Shubin ................... G02B 6/122

OTHER PUBLICATIONS

Nagarajan et al., 10 Channel, 100Gbit/s per Channel, Dual Polarization, Coherent QPSK, Monolithic InP Receiver Photonic Integrated Circuit. Optical Fiber Communication Conference. Los Angeles, CA. Mar. 6-10, 2011. Paper OML7. doi: 10.1364/OFC.2011.OML7. 3 pages.

* cited by examiner

MONOLITHIC SILICON COHERENT TRANSCEIVER WITH INTEGRATED LASER AND GAIN ELEMENTS

CROSS REFERENCE TO RELATED APPLICATIONS

This application claims the benefit of U.S. Provisional Patent Application Ser. No. 61/832,022 filed Jun. 6, 2013 which is incorporated by reference in its entirety as if set forth at length herein.

TECHNICAL FIELD

This disclosure relates generally to optical communications systems. More particularly, this disclosure pertains to a monolithic phase- and polarization diversity coherent transceiver photonic integrated circuit (PIC) having an integrated laser and optical amplifiers wherein an InP optical amplifier array is inserted into a recessed area into the PIC.

BACKGROUND

Contemporary optical communications systems make extensive use of transceivers in their operation. Accordingly, improved transceivers are a welcome addition to the art.

SUMMARY

An advance in the art is made according to an aspect of the present disclosure directed to a monolithic phase- and polarization diversity coherent transceiver Si photonic integrated circuit (PIC) having an integrated laser and optical amplifiers. An InP optical amplifier array is positioned within a recess formed in the Si chip such that Si optical structures and InP optical structures are butt coupled to one another. Spot size converters facilitate the butt coupling.

Structurally, transceiver devices according to the present disclosure include a Si substrate having formed thereon a Si waveguide; a recess formed in the Si substrate, said recess having a metal bonding pad deposited upon a bottom surface of the recess; and an InP gain chip positioned in the recess and bonded to the bonding pad such that any gain elements included on the gain chip are in optical communication with the Si waveguide.

BRIEF DESCRIPTION OF THE DRAWING

A more complete understanding of the present disclosure may be realized by reference to the accompanying drawing in which.

DETAILED DESCRIPTION

Figure 1:
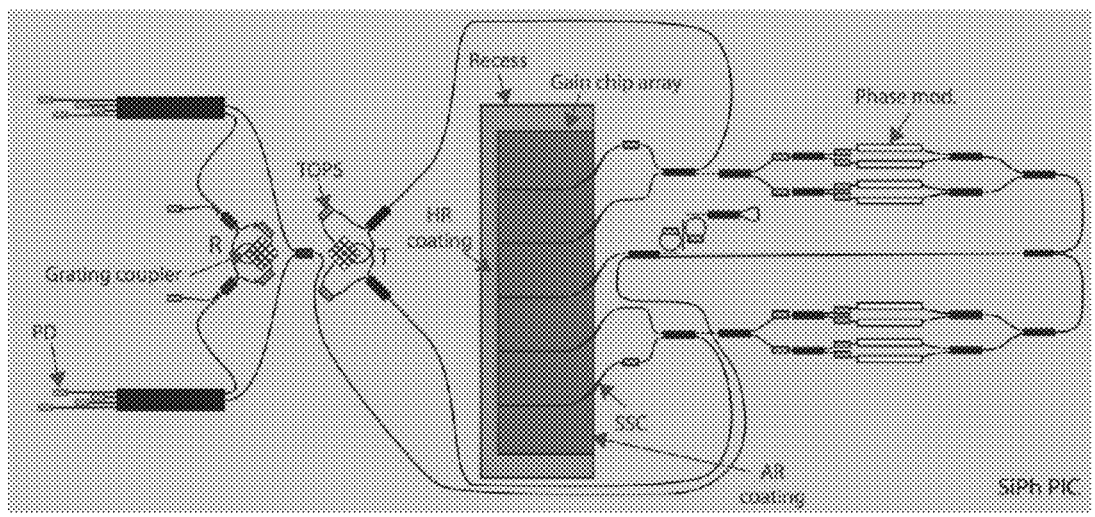
FIG. 1 shows a schematic of an illustrative transceiver according to an aspect of the present disclosure wherein an InP chip is integrated into a Si chip in a recess formed in the Si chip.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, we begin by noting that the development of a monolithic coherent transceiver having integrated laser(s) and optical amplifiers has proved elusive. Separate, non-integrated receivers and transmitters including lasers on an InP platform have been described however, InP yield(s) are generally poor due—in part—to the fact that all waveguides and other elements of such InP structures are fabricated via epitaxial growth in InP which exhibits a relatively high defect density.

One alternative then according to the present disclosure is to use Si as a platform with InP gain elements attached. And while InP elements have been successfully integrated with Si using oxide bonding, BCB bonding, butt coupling or lens couplers, these bonding techniques require lithography on the InP structure after it has been combined with the Si which is difficult to perform in a transitional Si foundry.

According to an aspect of the present disclosure, we now describe a Si platform including an array of InP gain chips butt coupled into a recessed area formed in the Si. Turning now to FIG. 1, there it shows a top view of a schematic drawing of an illustrative coherent transceiver according to an aspect of the present disclosure. As depicted therein, the photonic integrated circuit (PIC) includes recess into which is positioned a gain chip exhibiting a High Reflective coating (HR), an AntiReflective (AR) coating and optically connected to a number of phase modulators. Spot-size converters (SSC) are included in both the InP and anywhere the two materials are coupled together. Shown further in that illustration are a number of photodetectors (PD) optically connected to grating couplers which provide mechanisms for receiving input signals (R) and transmitting output signals (T) and further includes thermooptic phase shifters (TOPS).

Figure 2:
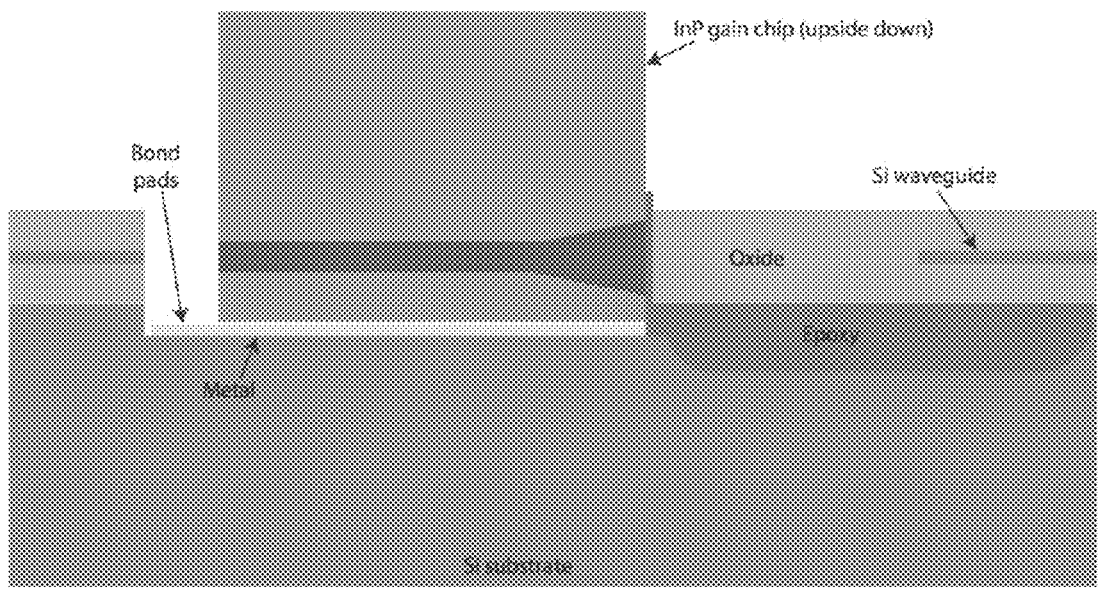
FIG. 2 shows a schematic illustration of a gain chip positioned in a recessed area of a Si chip according to the present disclosure.

While not readily apparent from FIG. 1—and as noted previously—the PIC includes a recess into which is positioned the gain chip. FIG. 2 shows a schematic side view of an illustrative embodiment of the InP—Si integration according to an aspect of the present disclosure.

With continued, simultaneous reference to both FIG. 1 and FIG. 2, we note that there are spot-size converters in both the InP and Si where the two materials couple together. Advantageously, only one end of the InP array needs to be coupled to the Si. Of further advantage, the Si chip may be made in a Si photonics foundry using standard, known processes for waveguides, modulators, and photodetectors. As may be observed from the figures, recessed areas are etched into the Si chip where any InP gain chips will be positioned.

Those skilled in the art will appreciate that SSCs may be fabricated in the Si photonic chip using standard techniques as well such as a cantilevered silica region. If such cantilevered silica regions are used, care must be taken to ensure that any undercut region does not extend into any recessed region(s) where gain chip(s) are positioned and attached. Metal traces may be deposited in the recessed areas.

Advantageously, such traces may extend past a side of the gain chip having a reflective facet such that wire bonding is facilitated. In one exemplary embodiment, gain chip(s) may be attached upside down into the recessed areas.

FIG. 2 shows in schematic form an illustrative PIC integrating both Si and InP chips according to the present disclosure. Shown in that illustration are a Si substrate, having formed thereon/therein a recess into which is positioned/affixed/coupled an InP chip. In this example, the InP chip is a gain chip and is shown upside down.

As may be further observed, a metal contact is deposited at a bottom of the recess, and this contact provides bonding pad(s) to which the chips electrically and/or mechanically interconnect. As shown further, a Si waveguide is formed in an oxide layer formed upon the Si substrate such that the waveguide is in sufficient optical alignment with the InP chip positioned within the recess. When so positioned and aligned, the Si chip is optically coupled to the InP chip via SSC.

It is now pointed out that a number of advantages of structures constructed according to the present disclosure become apparent. More particularly, and with reference to the specific exemplary embodiment(s) shown, a gain element array of five elements may be employed to form a laser and two optical amplifiers—one amplifier for each polarization.

The InP gain chip array is positioned in a recessed area of the Si PIC. Advantageously, improved heat sinking between the Si PIC and the InP gain chip is achieved by this arrangement. This is due—in part—to the improved thermal conductivity of Si as compared to InP (~149 as compared to ~68 W/m/K).

Additionally, illustrative structures according to the present disclosure employ a high-reflective coating on one side and an angled spot-size converter on another. Consequently, this requires coupling alignment with one facet, greatly facilitating assembly and yield.

Of further advantage, and as can be readily appreciated by those skilled the art, the height of the gain chip (or length) may vary significantly without substantially impacting the assembly.

Additionally, structures constructed according to the present disclosure allow for easy access to metal lines to the gain chip (which may be flipped) without requiring metal to "climb" or otherwise be deposited on the recess walls. The reflective facet advantageously makes a laser more efficient and permits same to exhibit a shorter cavity length than if it had spot-size converters on both ends.

Furthermore, structures according to the present disclosure may employ Michelson interferometers for optical amplifiers, employing two gain elements in a reflective interferometer. This advantageously increases the saturation power by a factor of two and allows for fine tuning of the phase to eliminate back reflection.

Still further, structures according to the present disclosure allow for a novel output coupler for the laser in which the coupler is positioned in the Si adjacent to the gain chip thereby allowing for a high power port to "feed" the transmitter and a lower power port to feed the local oscillator port of the receiver. This advantageously avoids the necessity of providing an output coupler on a high-reflectivity side of the gain chip—which those skilled in the art will appreciate is oftentimes employed in lasers having a gain chip in order to achieve a high optical power.

Finally, structures according to the present disclosure use length imbalance in the connection to the 2D grating coupler to make an optical filter such that some amplified spontaneous emission from the optical amplifier is filtered. And while such configuration is of course optional, one could instead crate a separate optical filter in the Si waveguide such as a ring resonator filter or Mach-Zehnder interferometer filter. In those instances where thermoelectric cooling is required or desired, one would prefer to position any drivers and transimpedance amplifiers (TIAs) off of the thermoelectric cooler, and the Si photonics chip would be placed on a cooled platform and the drivers and TIAs would be in close proximity connected by wire bonds but not on the cooler. If the driver needed to be further away however, for improved thermal isolation or other reasons, a small RF integrated circuit or board may be employed.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An apparatus, comprising:
   a substrate having a first waveguide, at least one photodetector, at least one modulator and a recess formed in the substrate, wherein the first waveguide is optically coupled to the at least one photodetector and to the at least one modulator;
   a chip having a second waveguide, a spot size converter, a first facet and a second facet;

wherein a portion of the first facet of the chip aligned with an end of the second waveguide is covered with a reflective coating;

wherein the chip is positioned in the recess such that the first waveguide is optically coupled to the second waveguide by the spot size converter and through the second facet of the chip.

2. The apparatus of claim 1, wherein at least a portion of the second waveguide comprises a gain medium.

3. The apparatus of claim 1, wherein the spot size converter is a first spot size converter, and wherein the second waveguide is optically coupled to the first waveguide by a second spot size converter disposed in the substrate.

4. The apparatus of claim 1,
wherein the substrate comprises a first wall and a second wall bounding the recess;
wherein the first waveguide is optically coupled to the second waveguide through the second wall of the recess;
wherein a first distance between the first wall of the recess and the first facet of the chip is greater than a second distance between the second wall of the recess and the second facet of the chip.

5. The apparatus of claim 4, wherein the second wall of the recess is in contact with the second facet of the chip.

6. The apparatus of claim 1, wherein a surface of the substrate bounding, at least in part, the recess, has a metal pad disposed thereon, and wherein the chip is disposed on the metal pad.

7. The apparatus of claim 1, wherein the second waveguide is at least a portion of an optical amplifier.

8. The apparatus of claim 1, wherein the second waveguide is at least a portion of a laser.

9. The apparatus of claim 8, wherein the chip further comprises a third waveguide, wherein the third waveguide is at least a portion of an optical amplifier.

10. The apparatus of claim 1, wherein the end of the second waveguide is a first end, wherein a portion of the second facet of the chip aligned with a second end of the second waveguide is covered with an anti-reflective coating.

11. The apparatus of claim 1, wherein the substrate is made of silicon.

12. The apparatus of claim 1, wherein the chip is made of indium phosphide.

13. The apparatus of claim 1, wherein the recess is a first recess, and
the substrate has a second recess formed therein;
wherein the second recess overlaps with an end of the first waveguide optically coupled to the second waveguide.

14. The apparatus of claim 13, where the first recess and the second recess are connected.

15. The apparatus of claim 13, wherein the second recess is at least partially filled.

16. The apparatus of claim 14, wherein the second recess is at least partially filled with an epoxy.

\* \* \* \* \*